E. DE ARMOND.
CULINARY UTENSIL.
APPLICATION FILED FEB. 23, 1922.
1,429,492.
Patented Sept. 19, 1922.
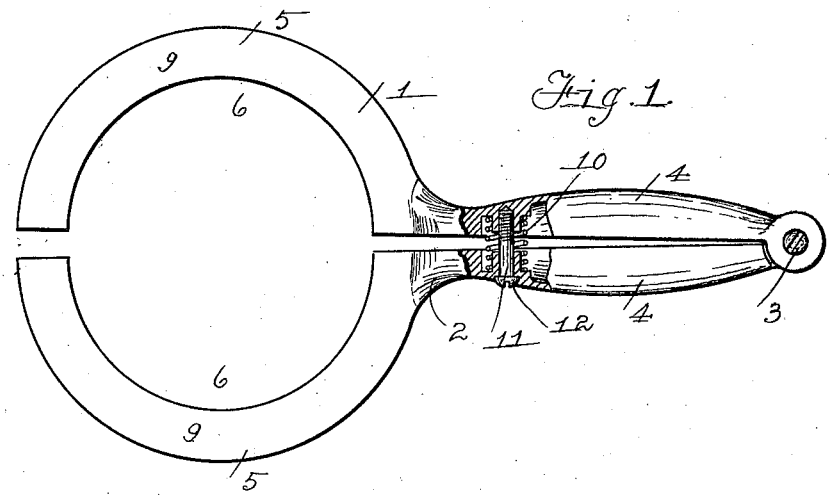
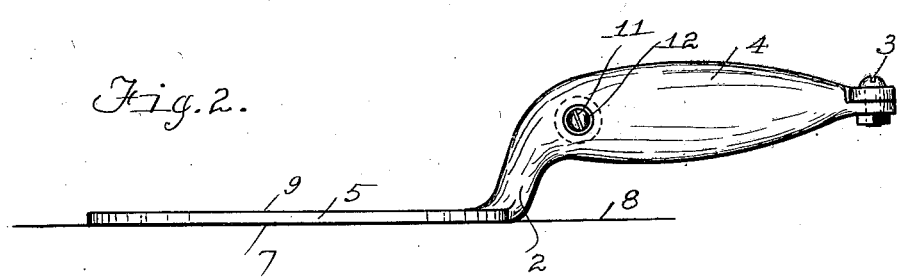
Witness:
Geo L. Chafes
Inventor:
Elroy De Armond
by Cyrus W. Rice
Attorney.

Patented Sept. 19, 1922.

1,429,492

UNITED STATES PATENT OFFICE.

ELROY DE ARMOND, OF GRAND RAPIDS, MICHIGAN.

CULINARY UTENSIL.

Application filed February 23, 1922. Serial No. 538,737.

*To all whom it may concern:*

Be it known that I, ELROY DE ARMOND, a citizen of the United States, residing at Grand Rapids, in the county of Kent and State of Michigan, have invented new and useful Improvements in Culinary Utensils, of which the following is a specification.

The present invention relates to culinary utensils; and its object is to provide a form or mold in which finely divided food may be formed or molded and from which the food thus molded or formed may be readily released without deforming the same.

This object is attained by, and the invention finds preferable embodiment in, the utensil hereinafter particularly described and illustrated by the accompanying drawings, in which:—

Figure 1 is a top plan view of a culinary utensil; and

Figure 2 is a side view of the same.

In the drawings, a utensil for molding or forming finely divided food, such as the meat ingredients of the sandwiches commonly called "Hamburger sandwiches," may be molded preparatory to cooking the same. This utensil comprises a pair of like members 1, 2 swingably connected at 3 so that they may be swung together or from each other. These members respectively have co-operating handle portions 4, 4 disposed oppositely to each other and adapted to be grasped by one hand to swing said members to each other; and said members respectively have also cooperating work-engaging portions 5, 5 adapted in the swung-together position of said members to surround and contact the finely divided food, thus constituting a mold or form therefor. To this end, these work-engaging portions have respectively equal semi-circular recesses 6, 6, the axis of their circular formation being parallel with that of the members' swingable connection at 3. The under sides or surfaces 7 of said work-engaging portions are in the same plane, so that both of these work-engaging portions may closely contact the surface of the table indicated at 8 on which the utensil is being used; preferably both said under sides 7 and the upper sides 9 of said work-engaging portions are in planes to which the axis of the swingable connection 3 of said members is perpendicular. A spring 10 presses the members 1, 2 apart and to the position seen in Figure 1, the separating movement of said members being limited by a stop element 11 having a head 12 as shown in Figure 1 to engage the member 2, the element 11 being threaded in the other member 1 so that by turning this screw the limit of these members' separating movement may be adjusted as desired.

As seen in Figure 2, the under sides 7 of the work-engaging portions 5, 5 are in a plane below the handle portions 4, 4, so that these handle portions may be readily grasped by hand while the under sides 7 of the work-engaging portions lie flat on the table 8.

This utensil is operated in the following manner: The operator grasps the two handle portions 4, 4 in one hand thus pressing the members 1 and 2 together, and places the utensil on the table or plane surface 8, with the under sides 7 of both work-engaging portions 5, 5 lying flat thereon. In this position, he fills the semi-circular recesses 6, 6 with the finely divided food, pressing down and molding the same in these recesses. Thereupon the food extending above the upper sides or surfaces 9 of the work-engaging portions 5, 5 is scraped away. On releasing the hand pressure on the handle portions 4, 4 sufficiently to separate the work-engaging portions 5, 5 from the molded food, the utensil may be raised without deforming the molded food.

The invention being intended to be pointed out in the claims, is not to be limited to or by details of construction of the particular embodiment thereof illustrated by the drawings or hereinbefore described.

I claim:

1. In a utensil of the character and for the purpose described; a pair of like members connected swingably to and from each other and respectively having oppositely disposed cooperating handle portions and oppositely disposed cooperating work-engaging portions adapted to surroundingly contact the work between them in the swung-together position of said members, the under sides of said work-engaging portions being in the same plane; a spring pressing said members apart; a stop limiting the separating movement of said members.

2. In a utensil of the character and for the purpose described; a pair of like members connected swingably to and from each other and respectively having oppositely disposed cooperating handle portions and oppositely disposed cooperating work-engaging portions adapted to surroundingly contact the work between them in the swung-together position of said members, the upper and under sides of said work-engaging portions being in parallel planes to which the axis of said members' swingable connection is perpendicular; a spring pressing said members apart; a stop limiting the separating movement of said members.

3. In a utensil of the character and for the purpose described; a pair of like members connected swingably to and from each other and respectively having oppositely disposed cooperating handle portions and oppositely disposed cooperating work-engaging portions having respectively equal semi-circular recesses coaxially parallel with the axis of the swingable connection of said members, and adapted to surroundingly contact the work between said work-engaging portions in the swung-together position of said members, the under sides of said work-engaging portions being in the same plane; a spring pressing said members apart; a stop limiting the separating movement of said members.

4. In a utensil of the character and for the purpose described; a pair of like members connected swingably to and from each other and respectively having oppositely disposed cooperating handle portions and oppositely disposed cooperating work-engaging portions adapted to surroundingly contact the work between them in the swung-together position of said members, the under sides of said work-engaging portions being in the same plane and below said handle portion; a spring pressing said members apart; a stop limiting the separating movement of said members.

5. In a utensil of the character and for the purpose described; a pair of like members connected swingably to and from each other and respectively having oppositely disposed cooperating handle portions and oppositely disposed cooperating work-engaging portions adapted to surroundingly contact the work between them in the swung-together position of said members, the under sides of said work-engaging portions being in the same plane; a spring pressing said members apart; an adjustable stop limiting the separating movement of said members.

In testimony whereof I have hereunto set my hand at Grand Rapids, Michigan, this 17th day of February, 1922.

ELROY DE ARMOND.